(12) United States Patent  (10) Patent No.: US 8,056,820 B2
Camus et al.  (45) Date of Patent: Nov. 15, 2011

(54) SECURITY STRUCTURE, PARTICULARLY FOR A SECURITY DOCUMENT AND/OR A VALUABLE DOCUMENT

(75) Inventors: Michel Camus, Rives sur Fure (FR);
Pierre Doublet, Saint-Brice (FR);
Pascal Marlin, Coulommiers (FR)

(73) Assignee: Arjowiggins Security, Issy les Moulineaux (FR)

( * ) Notice: Subject to any disclaimer, the term of this patent is extended or adjusted under 35 U.S.C. 154(b) by 201 days.

(21) Appl. No.: 12/373,413

(22) PCT Filed: Jul. 31, 2007

(86) PCT No.: PCT/FR2007/051753
§ 371 (c)(1),
(2), (4) Date: Jan. 12, 2009

(87) PCT Pub. No.: WO2008/015363
PCT Pub. Date: Feb. 7, 2008

(65) Prior Publication Data
US 2009/0243278 A1  Oct. 1, 2009

(30) Foreign Application Priority Data
Aug. 1, 2006 (FR) ..................................... 06 53231

(51) Int. Cl.
*G06K 19/06* (2006.01)

(52) U.S. Cl. ........................................ 235/492; 235/487
(58) Field of Classification Search .................. 235/492, 235/487
See application file for complete search history.

(56) References Cited

U.S. PATENT DOCUMENTS

| 2002/0172016 A1* | 11/2002 | Reiner | ........................... 361/728 |
| 2003/0164611 A1 | 9/2003 | Schneider et al. | |
| 2004/0065743 A1* | 4/2004 | Doublet | ........................ 235/487 |
| 2004/0154766 A1 | 8/2004 | Rancien et al. | |

FOREIGN PATENT DOCUMENTS

| DE | 198 49 762 A1 | 5/2000 |
| DE | 100 52 402 A1 | 6/2002 |
| FR | 2 827 986 A1 | 1/2003 |
| WO | WO 02/02350 A1 | 1/2002 |
| WO | WO 02/50890 A2 | 6/2002 |
| WO | WO 03/015016 A2 | 2/2003 |
| WO | WO 2006/029609 A2 | 3/2006 |
| WO | WO 2006/046216 A2 | 5/2006 |

OTHER PUBLICATIONS

Office Action issued in Russian Application No. 2009106191 issued Apr. 11, 2011 (with partial English translation).

* cited by examiner

*Primary Examiner* — Allyson Trail
(74) *Attorney, Agent, or Firm* — Oliff & Berridge, PLC

(57) ABSTRACT

The present invention concerns a security structure intended to be at least partially incorporated into or affixed to an article, particularly a security document and/or a valuable document, the structure comprising a substrate, at least one electronic device carried by the substrate, at least one non-electronic security and/or decorative element visible to the naked eye, carried by the substrate, covering only a portion of one side of the substrate and having no effect on the operation of the electronic device, and/or at least one amplifying antenna coupled with the electronic device and carried by the substrate, electronic device being at least partially visible so as to form with the security and/or decorative element a design chosen from among a geometric shape, particularly an ellipse, circle or polygon, a written symbol, particularly an alphanumeric character, and an image of a recognizable object, particularly a logo, a plant, an animal or a person.

35 Claims, 4 Drawing Sheets

SECURITY STRUCTURE, PARTICULARLY FOR A SECURITY DOCUMENT AND/OR A VALUABLE DOCUMENT

The present invention relates to a security structure designed to be at least partially incorporated into or affixed to an article, notably a security document and/or a document of value.

Through patent application DE 198 49 762, a traveler's check is known comprising a flexible polymer strip supporting an electronic chip, the strip and the chip being sunk into a layer of paper of the check. The strip also supports two metal tracks on either side of the electronic chip forming a bipolar antenna connected to this chip.

Also known, through international application WO 03/015016 is a document comprising, within a fibrous layer, a security strip supporting an electronic chip. This chip may comprise an integrated antenna optionally coupled to an additional antenna in order to increase the range of detection of the chip, this additional antenna being for example made by screen printing on the fibrous layer.

International application WO 02/02350 describes a multi-layer security structure designed to be attached to a security document or paper, one of the layers of which comprises an electronic chip and another comprises optical effects elements.

Patent application DE 100 52 402 relates to a bank note comprising a rectilinear security structure furnished at its ends with two capacitive antennas and also having an integrated circuit and an optical marking such as a barcode.

International application WO 02/50890 relates to a security element which uses an electroconductive link between a chip and a coupling element by means of an adhesive conductive layer comprising conductive particles.

Patent application FR 2 827 986 describes a method for manufacturing an article comprising a fibrous layer and an electronic chip which is brought into contact with the fibrous layer being formed with the aid of a flexible mount of elongated shape.

There is a need to have more new solutions for the protection of an article, notably a security document and/or a valuable document, against falsification and/or to furnish an article with an electronic chip.

The object of the present invention is notably to respond to this need.

According to one of its aspects, the subject of the invention is a security structure designed to be at least partially incorporated into or affixed to an article, notably a security document and/or a document of value, the structure comprising:
 a mount,
 at least one electronic device supported by the mount,
 at least one nonelectronic security and/or decorative element visible to the naked eye, supported by the mount, covering only a portion of a face of the mount, and having no effect on the operation of the electronic device, and/or
 at least one amplifying antenna coupled to the electronic device, supported by the mount.

In an exemplary embodiment of the invention, the electronic device is at least partially visible in order to form with the security and/or decorative element a design notably chosen from:
 a geometric shape, notably an ellipse, for example a circle, a polygon, for example a rectangle, a square, a star, etc.,
 a written symbol, notably an alphanumeric character, an ideogram, etc.,
 an image of a recognizable object, notably a logo, a person, an animal, a plant.

The security and/or decorative element may comprise portions having a well-defined shape, and the electronic device may be placed in a manner marked out relative to these portions, for example in a centered manner.

The invention may also make it possible to make it more difficult to attempt to manufacture the security structure because of the presence on the latter of a design that may be complex.

The invention may also make it possible to incorporate in an esthetic manner the electronic device into the security structure.

The security and/or decorative element may, if desired, be detectable by the naked eye, in visible light, without the use of a particular apparatus.

It is possible to use security and/or decorative elements having different appearances, for example different colors, in order to form a multicolored design.

One of the faces of the mount may for example be entirely covered by at least two security and/or decorative elements of different appearance.

The security and/or decorative element may be opaque or reflective.

In one exemplary embodiment of the invention, the security and/or decorative element is partially superposed on the electronic device.

As a variant, the electronic device and the security and/or decorative element are placed relative to one another without being superposed.

The electronic device and the security and/or decorative element may or may not touch.

The security and/or decorative element may define for example at least one window, notably of rectangular or square shape, in which the electronic device is placed.

In one exemplary embodiment of the invention, the security and/or decorative element comprises at least one coating layer, which may or may not be electrically conductive, capable of comprising a metal, notably aluminum. This coating layer may visually mask the electronic device or form a design interacting with the electronic device. The coating layer may be deposited by vacuum metallization. The possible design may be made by demetallization or by another means.

The coating layer may have a thickness of less than 300 nm or 100 nm, notably 50 nm, being for example of approximately 30 nm. This thickness is preferably thin enough not to hamper the remote detection of the electronic device when this layer covers the electronic device.

The coating layer may be reflective and/or opaque.

If desired, the security and/or decorative element may be arranged to generate at least one optically variable effect, and comprise for example a hologram.

The security and/or decorative element may have an iridescent effect, as appropriate.

The electronic device may have a metallized appearance, and comprise for example a silicon substrate.

In one exemplary embodiment of the invention, the electronic device comprises an electronic chip provided with at least one integrated antenna, the structure advantageously comprising at least one amplifying antenna, also called a booster antenna, coupled to the antenna of the electronic chip, in order to increase the range of detection of the chip.

The amplifying antenna may be at least partially visible or, as a variant, be totally masked by the security and/or decorative element.

If desired, the amplifying antenna and the security and/or decorative element have different appearances, notably different colors.

The mount may have at least one cavity and the electronic device may be at least partially engaged in this cavity. This may make it easier to integrate the structure into a document while avoiding the creation of an added thickness or while reducing the latter.

The mount may comprise a first and a second layer, at least in the vicinity of the cavity, and the latter may be formed in the first layer.

The electronic device may have a thickness that is substantially identical, or even less than the depth of the cavity.

The first layer may support an amplifying antenna and the second layer a coating, notably a metallization.

The structure may comprise an opaque or semi-reflective coating behind the electronic device, notably an aluminum coating, which may make it possible to create different optical effects.

The amplifying antenna may be made of copper or of other conductive materials.

The aforementioned mount may be flexible and/or transparent, being made for example of a plastic material, notably of polyester.

In one exemplary embodiment of the invention, the structure has a substantially strip-like shape, notably with a width ranging between 1 mm and 40 mm.

The structure may be arranged to be able to be incorporated at least partially within a notably fibrous layer of the article.

As appropriate, the structure may comprise a release layer making it possible to transfer it to a face of the article, notably by the application of heat and/or pressure. The structure may then form a "patch" or "foil".

A further subject of the invention, according to another of its aspects, is an article comprising a security structure as defined above.

The structure may be at least partially, for example entirely, sunk into a notably fibrous layer of the article.

The structure may comprise alternately zones sunk into the fibrous layer of the article and uncovered portions.

The security structure may extend from a first edge of the article to a second edge opposite to the first.

The article may be designed to constitute one of the following elements:
  a bank note, a security document, a sheet or cover of a passport, a visa, a coupon, a document of value other than a bank note, for example a check or a credit card, a protection and/or authentication label, a traceability label, a ticket.

A further subject of the invention, according to another of its aspects, is an article comprising:
  at least one layer, notably a fibrous layer, supporting an item of information, notably in the form of a first visible design,
  a security structure secured to said layer and comprising:
    a mount,
    at least one electronic device supported by the mount,
    at least one security and/or decorative element arranged to form with the electronic device a second design having a link with the item of information, this second design being for example similar to the first, for example identical give or take one homothetic transformation.

A further subject of the invention, according to another of its aspects is a method for manufacturing an article, comprising the following steps:
  supplying a security structure as defined above,
  incorporating or transferring at least partially the structure into or onto a notably fibrous layer of the article.

The invention will be better understood on reading the following detailed description of exemplary, nonlimiting embodiments of the invention, and on examining the appended drawing in which:

FIG. 1 represents schematically and partially an exemplary article produced according to the invention, FIGS. 2 to 11 represent schematically and partially various exemplary security structures according to the invention, FIG. 12 illustrates schematically a step of a method for manufacturing the article of FIG. 1, FIGS. 13 to 15 represent schematically and partially, in cross section, examples of incorporation of the security structure into the article, FIG. 16 represents schematically and partially an article made according to another exemplary embodiment of the invention, FIG. 17 illustrates schematically a step in the method for manufacturing the article of FIG. 16, FIG. 18 represents, in a top view, another exemplary structure made according to the invention, and FIG. 19 is a longitudinal section of the structure of FIG. 18.

In the drawing, for the purposes of clarity, the relative proportions of the various elements represented have not always been observed, the views being schematic.

FIG. 1 shows an article 1, for example a bank note, comprising a fibrous layer 2 in which a security structure 3 made according to an exemplary embodiment of the invention is incorporated.

The article 1 may also be a security paper, a sheet or a cover of a passport, a visa, a coupon, a valuable document other than a bank note, for example a check, a credit card or a ticket, a protection and/or authentication label or a traceability label, notably when the article is a packaging device, a card or a ticket for transport or for entry at an event, a secure and/or traceable package.

In the example considered, the structure 3, in the form of a strip with an axis X, has a width that is less than that of the article 1, being for example approximately 2 mm.

The structure 3 may be completely sunk within the fibrous layer 2, as can be seen in FIG. 13. As a variant, as illustrated in FIG. 14, the structure 3 is flush with a face 4 of the layer 2. As a further variant, as illustrated in FIG. 15, the structure 3 is partially sunk into the fibrous layer 2, so as to have alternately sunken and uncovered portions. For this reason, the fibrous layer 2 may comprise reinforcements 5 leaving portions of the structure 3 uncovered. The fibrous layer 2 may comprise, as appropriate, bosses 7, as shown in dashed line in FIG. 14, partially covering the structure 3. The article 1 may have, as appropriate, openings making the structure 3 easier to observe.

The structure 3 may comprise a mount 10 made of transparent plastic material, notably polyester, as illustrated in FIG. 2.

This mount 10 has for example a thickness ranging between 5 and 20 µm, being for example approximately 12 µm.

The structure 3 may be manufactured in a roll and comprise, before being cut up when the article 1 is produced, a plurality of electronic devices 11 spaced evenly along the axis X, for example chips or RFID modules.

Each electronic device 11 comprises, in the example considered, a chip of substantially rectangular or square shape provided with a silicon substrate having a metallic appearance.

The chip may for example have a substantially square shape 0.5 mm×0.5 mm in dimension, be provided with an integrated antenna, not shown, allowing remote detection of the chip, and be attached to a face of the mount 10 by bonding or heat-sealing.

The structure 3 comprises at least one security and/or decorative element 14, visible to the naked eye, supported by the mount 10, covering only a portion of a face of the latter, and having no effect on the operation of the electronic device 11.

In the example considered, the security and/or decorative elements 14 comprise a plurality of metallized portions 15 and 16 each formed by a layer of a metal coating, for example aluminum, formed for example by vacuum metallization, separated by windows 17 formed by partial demetallization.

Each metallized portion 15 has a substantially rectangular or square shape and is superposed on an electronic device 11 in order to mask it totally.

The metal coating layer defining each portion 15 for masking the corresponding electronic device 11 has for example a thickness of approximately 30 nm, which makes it possible to mask the underlying electronic device 11 without forming a screen to the remote detection of the latter, the electric conductivity of this layer being relatively weak.

In the example illustrated in FIG. 2, each portion 15 defines a design consisting of a geometric shape, namely a rectangle or square.

In the example of FIG. 3, each portion 15 is superposed only partially on the associated electronic device 11, which participates in the formation of a design that can be seen by transparency and/or reflection on the structure 3.

In FIG. 3, each portion 15 has a quadrilateral shape, for example a diamond, rectangle or square shape and the electronic device 11 is positioned relative to the portion 15 so as to overlap at its corners and thereby define a star-shaped design.

As a variant, as illustrated in FIG. 4, the electronic device 11 may be fully visible on a face of the security structure 3, through demetallized windows 17.

In this example, the structure 3 comprises on the one hand substantially rectangular metallized portions 18, extending on either side of the electronic devices 11, without contact with the latter, and, on the other hand, associated with each electronic device 11, an amplifying antenna 19 formed by a pair of conductive tracks 20 making it possible to increase the detection range of the electronic device 11.

These tracks 20 are for example made of copper and extend for example parallel to the axis X, on either side of the corresponding electronic device 11.

The amplifying antenna 19 may be coupled to an integrated antenna of the electronic device 11.

A multicolored design may be formed when different materials are used to produce the conductive tracks 20 and the metallized portions 18.

The metallized portions 18 and the electronic device 11 may be present on one and the same face of the mount 10, as illustrated in FIG. 5.

As a variant, as illustrated in FIG. 6, the metallized portions 18 and the electronic device 11 are present respectively on two opposite faces of the mount 10, the mount 10 then being preferably transparent in order to allow simultaneous observation from one face of the structure 3 of the electronic device 11 and of the metallized portions 18.

In the example illustrated in FIG. 4, the metallized portions 18 and the conductive tracks 20 of the amplifying antenna 19 are adjacent and are not superposed.

As a variant, as illustrated in FIG. 7, the metallized portions 18 are partially superposed on the conductive tracks 20, an electric insulating varnish 21 being able to be provided between the conductive tracks 20 and the metallized portions 18.

FIG. 8 shows a structure 3 arranged to generate an optically variable effect, notably thanks to a diffraction grating.

The structure 3 comprises a transparent layer 23 having a microstructure 24 covered with a reflective metal such as a layer of aluminum 26 in order to generate a hologram.

Layers 25 forming conductive tracks of an amplifying antenna associated with an electronic device 11 supported by the mount 10 are present on either side of the aluminum layer 26.

For the construction of the structure 3 illustrated in FIG. 8, it is possible to refer for example to international application WO 2006/046216.

Examples of designs that can be formed according to the invention will now be given.

Figure 1:
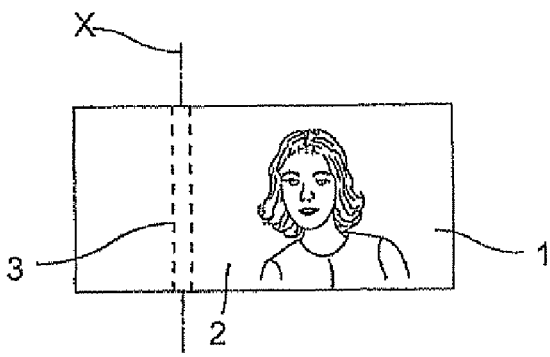
Figure 2:
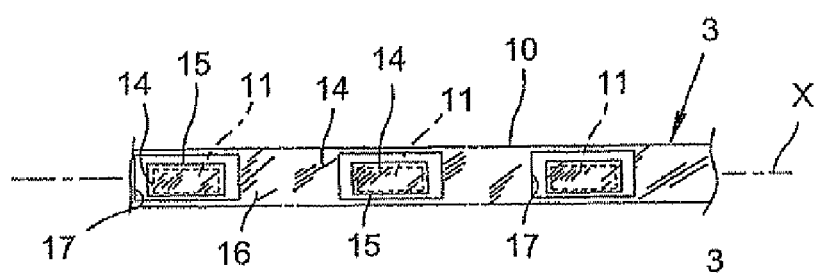
Figure 3:
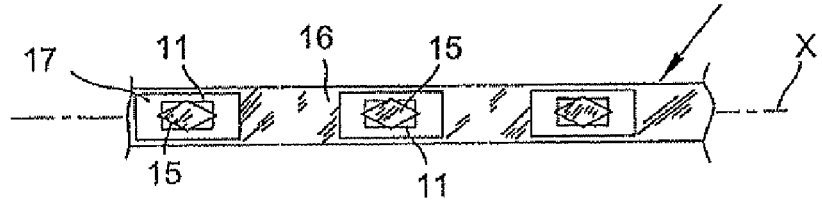
Figure 4:
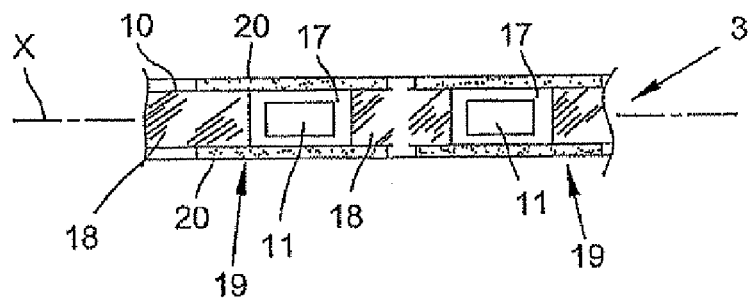
Figure 5:
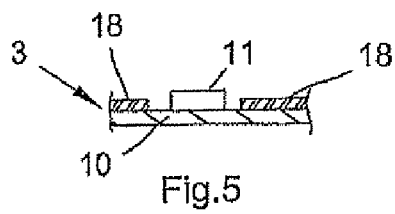
Figure 6:
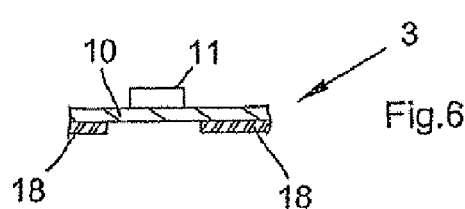
Figure 7:
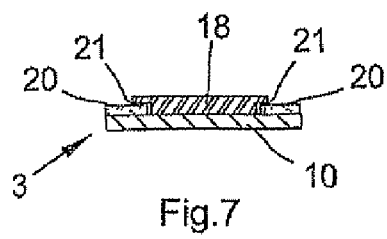
Figure 8:
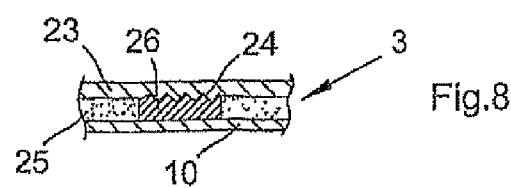
Figure 9:
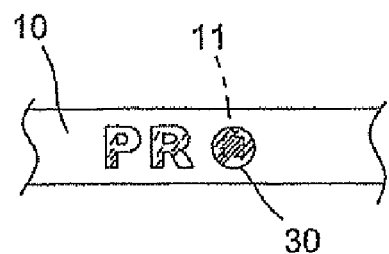
FIG. 9 illustrates a design defined by a series of alphanumeric characters, the electronic device 11 being masked by metallized portions 30 defining the characters.
Figure 10:
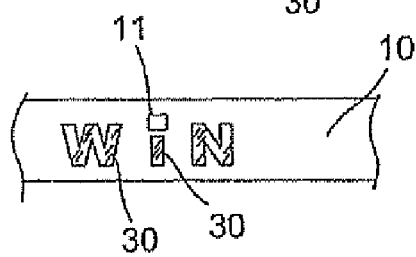
FIG. 10 illustrates another example of a design defined by a series of characters a portion of which is formed by the electronic device 11, for example the dot of the letter i.
Figure 11:
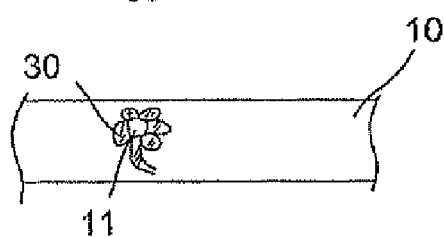
FIG. 11 shows a design representing a recognizable object, for example a flower, the electronic device 11 forming a visible element of this image.
Figure 12:
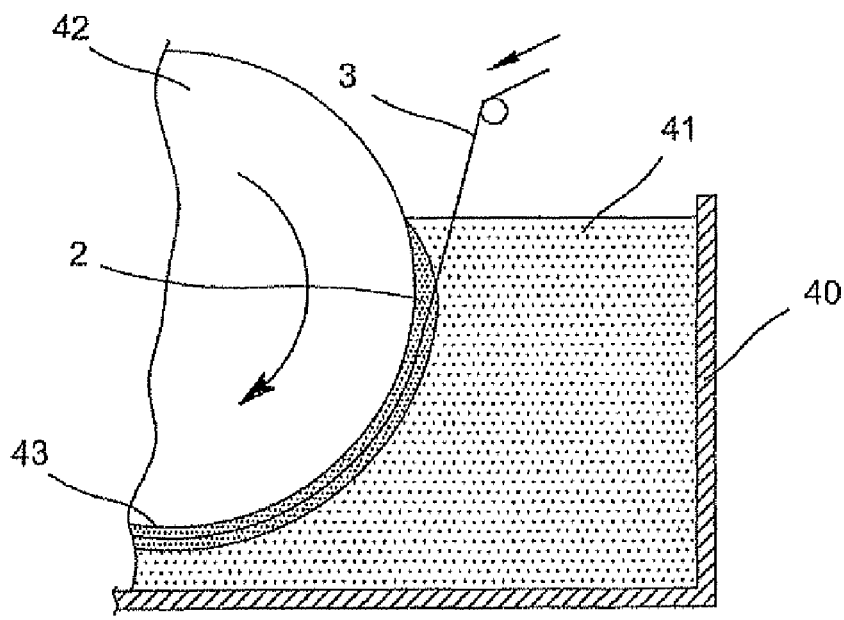
FIG. 12 shows schematically and partially a paper machine of round shape.
Figure 13:
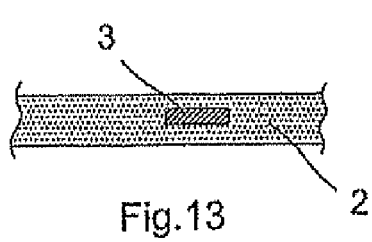
Figure 14:
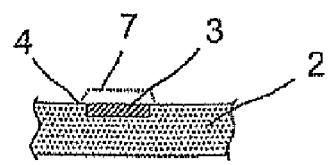
Figure 15:
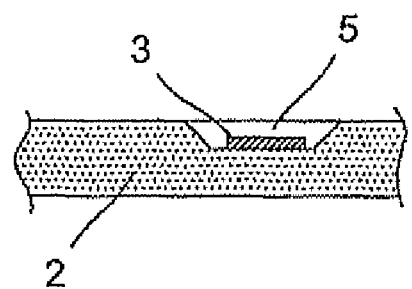

This machine comprises a tank 40 comprising a suspension 41 of fibers, for example cellulose fibers, cotton linters and/or synthetic and/or artificial fibers in which a rotary cloth cylinder 42 defining a surface 43 is submerged in contact with which the fibrous layer 2 is formed.

It is possible to incorporate the security structure 3 into the fibrous layer 2 during its formation.

Figure 16:
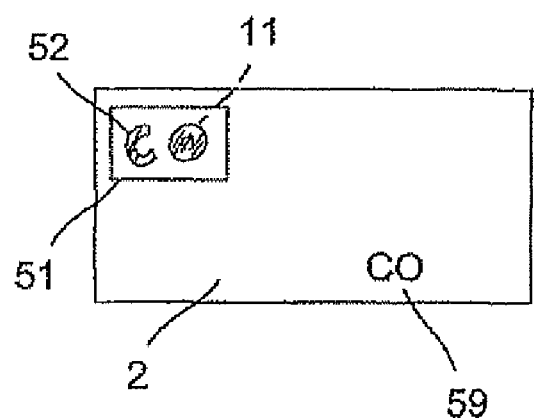

FIG. 16 shows a security document and/or a valuable document 50 according to another exemplary embodiment of the invention, comprising a security structure 51 transferred onto a fibrous layer 2 of the article 50.

Figure 17:
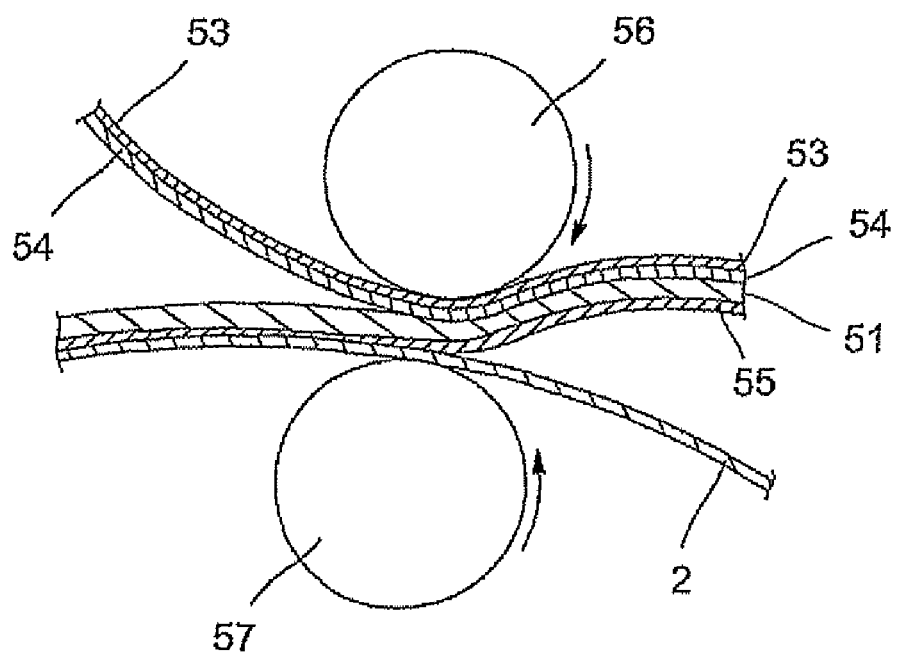

The structure 51, also called a "foil" or a "patch", comprises an electronic device 11 and metallized portions 52 defining a design initially secured to a mount 53 via a release layer 54, as illustrated in FIG. 17.

The structure 51 is bonded to the fibrous layer 2 with the aid of a layer of adhesive 55.

The structure 51 may be transferred hot to the fibrous layer 2.

The layer 2 and the structure 51 are then moved in the same direction by means of a machine comprising a first rotary cylinder 56 and a second rotary cylinder 57. After this stage, the mount 53 and the release layer 54 are separated from the rest of the structure 51 which remains secured to the layer 2.

The design formed on the structure 51 may be similar to an item of information 59 visible on the document, as illustrated in FIG. 16.

Figure 18:
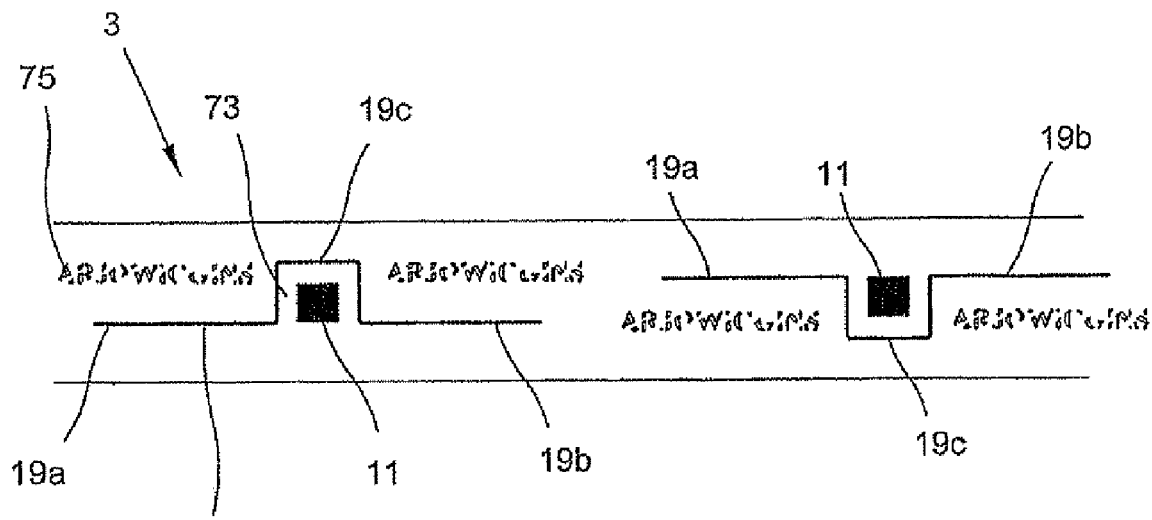
Figure 19:
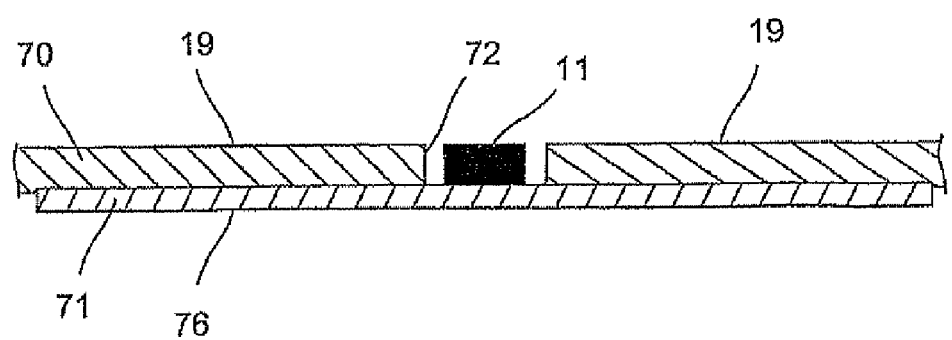

The structure 3 shown in FIGS. 18 and 19 comprises a mount 10 comprising a first layer 70 which for example consists of a film of a transparent material, for example a film of polyester approximately 70 μm thick, and a second layer 71 which also consists for example of a film of a transparent material, for example a film of polyester 12 μm thick.

In the example in question, the second layer 71 extends only over a portion of the length of the first layer 70 being present on the structure so as to form the bottom of a cavity 72 formed in the first layer and receiving the electronic device 11.

The thickness of the latter corresponds for example substantially to the thickness of the first layer 70 and the dimension of the cavity 72, when observed from above, is for example slightly greater than that of the electronic device 11.

The first layer 70 and second layer 71 are for example secured by bonding or by hot rolling or by co-extrusion.

The first layer 70 supports an amplifying antenna 19 which may have, as in the example illustrated, two branches 19a, 19b joined by an intermediate portion 19c substantially hugging the contour of the device 11 so as to form with the latter a gap 113 of substantially constant width.

The structure 3 may also comprise an inscription 75, formed for example by metallization of the first layer 70 in the same material as that used to form the antenna, for example copper, the thickness of copper being approximately 1 µm for example.

The inscription 75 may also be formed by a printing of an ink, like the antenna 19, the latter then being in a conductive ink.

The second layer 71 may comprise, on its outer face, a coating 76 which may be opaque or semi-reflective, depending on the effect sought.

The coating 76 is for example a metallization and, depending on the thickness of metal deposited, for example aluminum, it is possible to obtain an opaque background, for example with an optical density close to 1.7, or semitransparent, for example with an optical density ranging from 0.4 to 1.

As appropriate, the second layer 71 may receive on its outer face a colored ink in order to increase the number of color combinations.

In a variant not illustrated, the second layer 71 extends over the same length as the first layer 70.

If the coating layer 76 is opaque, when the structure is observed in reflection, it is possible to see two different colors namely that of the copper of the amplifying antenna 19 and of the inscription 75 and that of the aluminum background. When the structure is observed in transmission, the observer sees only a uniform and opaque continuous wire.

If the coating 76 is semi-reflective, observation in transparency makes it possible to see the inscription 75 and the antenna 19 as positive opaque on a grey background and observation in reflection makes it possible to see both colors, on the one hand of the amplifying antenna and of the inscription, and on the other hand of the coating 76.

A further subject of the invention, independently of or in combination with the foregoing, is a security structure comprising two layers, the first layer comprising a cavity in which an electronic device is housed and the second layer forming the bottom of the cavity, the first layer and the second layer being produced with a transparent substrate, the first layer comprising at least a first coating of a first color and the second layer a second coating of a second color, this second coating being able to be opaque or semi-reflective, the coatings of the first and second layers being for example metallizations of different metals. The coating of the first layer may form an inscription and/or an amplifying antenna for the electronic device, which is for example an RFID device.

Naturally, the invention is not limited to the exemplary embodiments that have just been described. The features of the various examples described may notably be combined within variants not illustrated.

At least one of the coating layers forming the security and/or decorative element may incorporate, if it is desired, security particles or fibers.

The expression "comprising a" must be understood as being synonymous with "comprising at least one", unless specified otherwise.

The invention claimed is:

1. A security structure configured to be at least partially incorporated into or affixed to an article, the structure comprising:
   a mount,
   at least one electronic device supported by the mount,
   at least one nonelectronic security and/or decorative element visible to the naked eye, supported by the mount, covering only a portion of a face of the mount, and having no effect on the operation of the electronic device,
   the electronic device being at least partially visible to form with the security and/or decorative element a design chosen from:
   a geometric shape
   a written symbol, and
   an image of a recognizable object.

2. The structure as claimed in claim 1, comprising at least one nonelectronic security and/or decorative element that is visible to the naked eye, supported by the mount, covering only a portion of a face of the mount, and having no effect on the operation of the electronic device.

3. The structure as claimed in claim 1, the electronic device being superposed at least partially with the security and/or decorative element.

4. The structure as claimed in claim 1, the electronic device and the security and/or decorative element being placed relative to one another without being superposed.

5. The structure as claimed in claim 4, the electronic device and the security and/or the decorative element having no contact with one another.

6. The structure as claimed in claim 4, the security and/or decorative element defining at least one window in which the electronic device is placed.

7. The structure as claimed in claim 1, the security and/or decorative element comprising at least one coating layer.

8. The structure as claimed in claim 7, the coating layer being electrically conductive.

9. The structure as claimed in claim 7, the coating layer comprising a metal.

10. The structure as claimed in claim 7, the coating layer having a thickness of less than 100 nm.

11. The structure as claimed in claim 1, the security and/or decorative element being configured to generate at least one optically variable effect.

12. The structure as claimed in claim 11, the amplifying antenna and the security and/or decorative element having different colors.

13. The structure as claimed in claim 1, the electronic device comprising a chip provided with at least one integrated antenna, the structure comprising at least one amplifying antenna.

14. The structure as claimed in claim 13, the amplifying antenna being at least partially visible.

15. The structure as claimed in claim 1, the mount having at least one cavity and the electronic device being at least partially engaged in this cavity.

16. The structure as claimed in claim 15, the mount comprising a first layer and a second layer at least in the vicinity of the cavity and the latter being formed in the first layer.

17. The structure as claimed in claim 16, the first layer supporting an amplifying antenna and the second layer supporting a coating.

18. The structure as claimed in claim 15, the electronic device having a thickness that is substantially identical to or less than the depth of the cavity.

19. The structure as claimed in claim 1, comprising an opaque coating behind the electronic device.

20. The structure as claimed in claim 19, the coating being made of aluminum.

21. The structure as claimed in claim 1, comprising a semi-reflective coating behind the electronic device.

22. The structure as claimed in claim 1, the mount being flexible and/or transparent.

23. The structure as claimed in claim 1, having a substantially strip-like shape.

24. The structure as claimed in claim 1, comprising a release layer making it possible to attach the structure to an article.

25. The structure of claim 1, wherein the geometric shape is an ellipse, a circle or a polygon.

26. The structure of claim 1, wherein the design is a written symbol comprising alphanumerical characters.

27. The structure of claim 1, wherein the design is a logo, a plant, an animal or a person.

28. An article comprising a security structure as defined in claim 1.

29. The article as claimed in claim 28, the structure being at least partially sunk into a layer of the article.

30. The article as claimed in claim 29, the structure comprising alternately zones sunk into fibrous layer of the article and uncovered portions.

31. The article as claimed in claim 28, the security structure extending from a first edge of the article to a second edge opposite to the first.

32. The article as claimed claim 28, configured to constitute one of the following elements:
    a bank note, a security document, a sheet or cover of a passport, a visa, a coupon, a document of value other than a bank note, for example a check or a credit card, a protection and/or authentication label, a traceability label, a ticket.

33. An article comprising:
    at least one layer, supporting an item of information in the form of a first visible design,
    a security structure secured to said layer and comprising:
    a mount,
    at least one electronic device supported by the mount,
    at least one security and/or decorative element arranged to form with the electronic device a second design having a link with the item of information.

34. The article of claim 33, the second design being similar to the first design.

35. The structure as claimed in claim 1, comprising at least one amplifying antenna coupled to the electronic device, supported by the mount.

* * * * *